(12) United States Patent
Karl

(10) Patent No.: US 9,541,642 B2
(45) Date of Patent: Jan. 10, 2017

(54) METHOD AND DEVICE FOR DETERMINING THE POSITION AND/OR THE MOVEMENT OF AN OBJECT

(71) Applicant: Robert Bosch GmbH, Stuttgart (DE)

(72) Inventor: Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 14/372,435

(22) PCT Filed: Dec. 7, 2012

(86) PCT No.: PCT/EP2012/074751
§ 371 (c)(1),
(2) Date: Jul. 15, 2014

(87) PCT Pub. No.: WO2013/107563
PCT Pub. Date: Jul. 25, 2013

(65) Prior Publication Data
US 2015/0078133 A1 Mar. 19, 2015

(30) Foreign Application Priority Data

Jan. 19, 2012 (DE) .................... 10 2012 200 743

(51) Int. Cl.
*G01S 15/06* (2006.01)
*G01S 7/52* (2006.01)
(Continued)

(52) U.S. Cl.
CPC ............ *G01S 15/06* (2013.01); *G01S 7/52004* (2013.01); *G01S 15/931* (2013.01); *G01S 7/006* (2013.01);
(Continued)

(58) Field of Classification Search
CPC ...... G01S 7/52004; G01S 15/06; G01S 7/006; G01S 2007/52009; G01S 15/931; G01S 2015/938
See application file for complete search history.

(56) References Cited

U.S. PATENT DOCUMENTS

| 5,260,910 A * | 11/1993 | Panton ................ G01S 7/524 367/98 |
| 5,943,294 A * | 8/1999 | Cherek ............ G01F 23/2965 367/98 |
| 2015/0078133 A1* | 3/2015 | Karl .................... G01S 7/52004 367/99 |

FOREIGN PATENT DOCUMENTS

| DE | 10 2009 040992 | 3/2011 |
| DE | 10 2010 003624 | 10/2011 |

(Continued)

OTHER PUBLICATIONS

Translation of DE102009040992.*
(Continued)

*Primary Examiner* — Daniel Pihulic
(74) *Attorney, Agent, or Firm* — Norton Rose Fulbright US LLP; Gerard Messina

(57) ABSTRACT

In a method for determining the position and/or the movement of at least one object in the surroundings of a vehicle with the aid of at least one transmitted acoustic signal, the time behavior of at least one electrical signal of an electroacoustic transducer during the transmission of the acoustic signal and/or during a decay of the electroacoustic transducer following the transmission and/or during the reception of the acoustic signal reflected on the object is analyzed at least during a suitable fraction of a signal period in such a way that changes of the electrical signal of the electroacoustic transducer is detected.

10 Claims, 4 Drawing Sheets

(51) Int. Cl.
*G01S 15/93* (2006.01)
*G01S 7/00* (2006.01)
(52) U.S. Cl.
CPC *G01S 2007/52009* (2013.01); *G01S 2015/938* (2013.01)

(56) References Cited

FOREIGN PATENT DOCUMENTS

| EP | 2 251 710 | 11/2010 | | |
|---|---|---|---|---|
| WO | WO 2010/076061 | 7/2010 | | |
| WO | WO 2011/009786 | 1/2011 | | |
| WO | WO 2013107563 A1 * | 7/2013 | ......... | G01S 7/52004 |

OTHER PUBLICATIONS

Translation of DE102010003624.*
International Search Report for PCT/EP2012/074751, dated Mar. 28, 2013.

* cited by examiner

METHOD AND DEVICE FOR DETERMINING THE POSITION AND/OR THE MOVEMENT OF AN OBJECT

BACKGROUND OF THE INVENTION

1. Field of the Invention

The present invention relates to a method for determining the position and/or the movement of at least one object in the surroundings of a means of transportation, in particular of a vehicle, and/or for transmitting information with the aid of at least one transmitted acoustic signal, and a surroundings detection device for carrying out the method according to the present invention.

2. Description of the Related Art

Ultrasonic systems which measure in pulses are presently conventionally used for the acoustic surroundings detection of vehicles. Due to a high level of mechanical robustness, their operating range is generally restricted to a small frequency range. They have a high quality. It is known to those skilled in the art that systems having a high quality require a relatively long time until they have dissipated an oscillation amplitude again after an excitation. The time which is necessary to dissipate the excitations is referred to as decay. Electroacoustic transducers of sensors, which are used both for the emission and for the subsequent reception, require a preferably short decay to also allow a measurement at close range with the aid of pulse runtime measurement.

The decay begins with the end of the transmission pulse generation and ends when the oscillation amplitude is significantly less than the amplitude of potential echoes and/or signals to be received.

The decay may be changed, on the one hand, by external influences, as are shown in FIG. 1, or, on the other hand, by internal-sensor features such as damage to the electroacoustic transducer, for example, by road stone.

FIG. 1a shows a vehicle 10, which has at least one sensor 20, which is covered by a thin ice coating 30. FIG. 1b shows a vehicle 10, whose rear sensors 40 are covered with a layer of powdered snow. Ice coating 30 in FIG. 1c extends over only a part of the diaphragm of the transducer of sensor 20. FIG. 1d again shows a vehicle 10, which has a sensor 20 at the right rear, which is shielded by a snow curtain 40. FIG. 1e shows a side view of vehicle 10 from FIG. 1d, sensor 20, which is installed in bumper 25 and is shielded by snow curtain 40 at a distance of approximately 20 mm in front of the bumper, again being visible.

In the case of the described sensors, it is preferred that they are subjected to a manufacturing test and that they have an independent monitoring function for studying the functional capability of the measuring system formed by the sensors during operation. With the aid of the independent monitoring function, the sensors may be put into a safe operating state, in particular in the event of a decrease of the sensor performance or in the event of damage, which may occur as a result of external disturbances, for example, such as damping due to a coating.

It is not only important to achieve an improvement of the sensor performance in the range of the measuring capability for distances beyond 20 cm, but rather also to be able to detect in the range of the object shape differentiation and the close-range measuring capability at distances of 5 cm or less, for example, to also be able to detect a snow curtain or a coating on the sensor, which cover sensors, as shown in FIGS. 1d and 1e.

These aspects were heretofore only checked on the basis of a measurement of the decay duration.

Alternatively, these aspects could also be checked with the aid of a frequency measurement. For example, the attempt has been made with the aid of a frequency measurement to determine the errors in the decay which occurred during the sensor manufacturing with the aid of bandwidth estimation. For this purpose, a system (surroundings detection device) 50 according to FIG. 2 is operated, in which a frequency measurement is carried out with the aid of an analysis unit 55. FIG. 2 schematically shows a surroundings detection device 50, having an acoustic unit 60 for transmitting and/or receiving acoustic signals 70 of today's ultrasonic sensors 75.

A transmission pulse generator 80 generates a pulsed transmission signal (not shown), in that signal generator 80, during the transmission pulse duration, outputs an electrical signal having signal frequency f to electroacoustic transducer (acoustic unit) 60. This transducer 60 begins to oscillate at frequency f of the transmission pulse and therefore to output an acoustic transmission pulse 70. Depending on the quality and resonant frequency $f_R$ of transducer 60 and the frequency locations of the frequency-determining components surrounding transducer 60, in the case of this type of frequency measurement, objects at different distances are often recognized by sensor 75, in particular upon variation of the sensitivity threshold. The experimental concept was based on the assumption that sufficiently good conclusions about sensor features could be drawn solely from the oscillation amplitude of the echoes at various signal frequencies with the aid of this type of frequency measurement.

Undisturbed sinusoidal signals may be described by equation (1) represented as follows:

$$r(\tau)=A_1 \cdot \sin(2\pi f \tau + \phi) + A_0 \quad (1)$$

In the frequency range, the features of periodic sinusoidal signals are determined with the aid of filters, while direct component $A_0$ is obtained by averaging. The most important features of filters for periodic signals are filter frequency $f_h$, bandwidth B, and the phase dependence. The closer frequency f of the periodic signal to be studied is to filter frequency $f_h$, the more strongly such a filter oscillates in comparison to the filters of other filter frequencies $f_h$.

Bandwidth $B=f_O-f_U$ describes the frequency range $f_U \leq f_h < f_O$ around filter frequency $f_h$ in which signal frequency f may vary, without the strength of the oscillation, (i.e., the deflection amplitude of the filter) having significantly decreased, in particular so that the strength of the oscillation decreases by not more than 3 dB. At a given signal amplitude $A_1$, the strength of the oscillation increases with the decrease of bandwidth B. This feature is also summarized by the parameter designated as quality $Q=f_h/B$.

Filters which are independent of the phase relation of the signal to be studied to the phase relation of the observing measuring system and therefore do not have a phase dependence are referred to as incoherent filters. In contrast, phase-dependent filters are referred to as coherent filters. If the phase of the signal to be studied rotates in relation to that of the measuring system in the case of coherent filters by 90°, the oscillation state of these filters thus changes from maximum deflection in resonance to rest or vice versa.

The less the bandwidth of the filter, the longer it takes, however, until the filter has settled. This phenomenon may also be referred to as fuzziness of the frequency detection. To be able to reliably detect a frequency with the aid of a filter, the time until reaching the settled state of the filter is to be waited out, which generally lasts more than one period.

The time required for determining parameters φ, f, and $A_1$ may be decreased if the gradient of the oscillation intensities is analyzed with the aid of a bank of filters having filter frequencies $f_n$ slightly offset to one another.

All frequency measurements have the disadvantage that they require multiple periods until changes in the signal are recognized. In particular, frequency measurements which require an excitation using signal shapes of various carrier frequencies are disadvantageous, for example, as in the case of the above-explained bandwidth estimation.

An important requirement may be recognized from FIG. 1e, specifically the close-range measuring capability of an ultrasonic sensor. Nearby objects, or even curtains in front of the transducer, which do not massively influence the resonance properties of the transducer, may not be recognized with the aid of a frequency measurement, since the echoes already come back to the transducer during the decay of the transducer, on the one hand, and the signal at the transducer is only so slightly varied by such objects, on the other hand, that these changes may not be exposed sufficiently solely with the aid of a form of the runtime-dependent amplification, as is known from the publication published international patent application document WO 2010/076061 A1.

A coating, in particular made of ice or mud, which is 1 mm in front of the transducer, for example, also may not always be sufficiently recognized with the aid of a frequency measurement by way of a pulse duration modulation, which is known, for example, from the publication published European patent application document EP 2 251 710 A2. A system and a method are described in the publication EP 2 251 710 A2, which relate to emitting ultrasonic pulses of different pulse duration (pulse duration modulation) and pulse strength, to monitor partial areas located at different distances from the sensor system.

An intrapulse analysis is known from the publication published international patent application document WO 2011/009786 A1, which is used for surroundings detection. Acoustic alternating signals are used, which may therefore be described as a period duration sequence having a time-variable signal strength. The intrapulse analysis includes the determination of a measurement sequence of period durations of a received acoustic signal, which, similarly to a fingerprint, is a characteristic both for the emitted transmission pulse and for the transmission path to a receiving unit, respectively. If an analysis unit knows the fingerprint which is characteristic for a transmission scenario, which is preferably represented by a sequence of reference period durations, it may thus be detected on the receiver side which scenario was present in the case of a received acoustic signal.

BRIEF SUMMARY OF THE INVENTION

According to the present invention, a method is provided for determining the position and/or the movement of at least one object in the surroundings of a means of transportation, in particular a vehicle, and/or for transmitting information with the aid of at least one transmitted acoustic signal, in which the time behavior of at least one electrical signal of an electroacoustic transducer during the transmission of the acoustic signal and/or during a decay of the electroacoustic transducer following the transmission and/or during the reception of the acoustic signal, which is transmitted and reflected on the object, or at least one acoustic signal reflected on the object is analyzed at least during a suitable fraction of a signal period in such a way that changes of the electrical signal of the electroacoustic transducer may be detected.

Furthermore, according to the present invention, a surroundings detection device for carrying out the method according to the present invention is provided, which includes at least one electroacoustic transducer and which includes an analysis device, which is designed for the purpose of analyzing the time behavior of at least one time-continuous electrical signal or an electrical signal of the electroacoustic transducer which is discretized with respect to time with the aid of a sampling device during the transmission of an acoustic signal and/or during a decay of the electroacoustic transducer following the transmission and/or during the reception of the acoustic signal, which is transmitted and reflected on at least one object in the surroundings of a means of transportation, in particular a vehicle, or at least one acoustic signal reflected on the object in such a way that changes of the electrical signal of the electroacoustic transducer may be detected.

According to the present invention, a method is provided in particular for determining the position and/or the movement of objects in the surroundings of means of transportations, such as mobility scooters, Segways, bicycles, electric cars, and other vehicles such as automobiles, buses, and trucks with the aid of emitted acoustic signals, the time behavior of the signals being analyzed on the electroacoustic transducer, in particular the transmitting electroacoustic transducer.

According to the present invention, a method and a surroundings detection device are provided, with the aid of which changes in the signal curve of narrowband signals, which are used for surroundings detection, may be rapidly detected during the decay, optionally also during the emission of a transmission pulse, and in particular also during the reception of signals and echoes. According to the present invention, the state of the sensor, in particular the transducer, is inferred from the type of the signal changes, the sensor being impaired, for example, by damages such as road stone, accident, incorrect installation, in particular loose and/or tilted installation, or also by sensor manufacturing errors. Furthermore, the state of the transmission signal coupling circuit and the reception signal decoupling circuit and features which impair the functional readiness of the sensors, such as coatings in front of the sensor in particular, are inferred.

On the basis of the signal analysis in the time range according to the present invention, in the case of a time-continuous signal analysis with negligible interference, even less than ¼ of the signal period is sufficient to be able to detect changes of the electrical signal of the electroacoustic transducer.

In one particularly preferred specific embodiment of the present invention, to detect changes of the electrical signal of the electroacoustic transducer, at least one characteristic signal parameter, in particular at least one minimum and/or maximum signal strength and/or at least one maximum between a minimum and a maximum signal strength value and/or at least one mean value, for example, a mean value with respect to the voltage zero point, is analyzed. At least one comparable signal strength characteristic value and/or at least one point in time of the occurrence of a zero crossing and/or the occurrence of a minimum signal strength (minimum peak) and/or a maximum signal strength (maximum peak) may also be determined at least during the suitable fraction of the signal period or at least during a signal period and compared to at least one corresponding expected value and/or, in the case of a repeated determination of the characteristic signal parameter, to at least one corresponding previously determined characteristic signal parameter.

With the aid of the time analysis according to the present invention at least during one signal period, substantially more items of information may be obtained from the signal, for example, in particular the duration of each half-period, the peak height of each half-period, and the chronological location of the peak within each half-period, than using a conventional frequency measurement, which only delivers reliable values if the system to be studied is in a stationary state.

The more characteristic signal parameters are already known at the beginning of the estimation, the more rapidly a determination of the still open signal parameters is achieved with the aid of the signal analysis according to the present invention in the time range.

In the case of interference-free sinusoidal signals, at most ¾ of the period duration is necessary to determine all signal parameters with the aid of the signal analysis according to the present invention in the time range.

In the method according to the present invention, in particular the signal curve of the electrical signal of the electroacoustic transducer is discretized with respect to time with the aid of preferably equidistant sampling, preferably after a zero crossing, and at least one characteristic parameter is determined on the basis of the signal strength values determined with the aid of the sampling.

Preferably, in the method according to the present invention, at least one electrical signal of the electroacoustic transducer, which is generated from a received acoustic signal reflected on the object, is amplified with the aid of an amplification, which depends on the run time of the received acoustic signal, before the analysis of its time behavior. In particular, multiple pulse-duration-modulated acoustic signals are transmitted to determine the position and/or the movement of the object.

In one particularly advantageous specific embodiment of the present invention, a spatial arrangement of the objects in the surroundings of the means of transportation, in particular the vehicle, is determined with the aid of the electrical signal of the electroacoustic transducer, which is analyzed with respect to its time behavior. In particular, the driver of the means of transportation is informed about the determined spatial arrangement of the objects and/or assisted by an intervention, which is suitable for the determined spatial arrangement of the objects, into the means of transportation dynamics, in particular into the vehicle dynamics.

In other words, in the method according to the present invention, the spatial arrangement of objects in the surroundings of the means of transportation, in particular the spatial arrangement of the objects to other vehicles, to structures, for example, to curbstones or buildings, to vegetation, to humans and animals, is determined to inform the driver and/or to intervene in an assistive way into the driving operation by steering, accelerating, or braking, for example.

In one particularly preferred specific embodiment of the present invention, the analysis device included by the surroundings detection device according to the present invention is designed for the purpose of providing the electrical signal of the electroacoustic transducer to a determination device as an input signal, which is designed for the purpose of determining at least one characteristic signal parameter of the electrical signal of the electroacoustic transducer, or determining it repeatedly. The analysis unit according to the present invention furthermore includes an evaluation unit, which is designed for the purpose of comparing the characteristic signal parameter to at least one corresponding stored expected value and/or, in the case of repeated determination of the characteristic parameter, to at least one corresponding stored previously determined characteristic signal parameter to detect changes of the electrical signal of the electroacoustic transducer, and optionally to provide it for subsequent post-processing.

Another particularly preferred specific embodiment of the present invention is based on signal-curve-dependent sampling of the signals. In particular during the transmission and during the decay, such a method, which is quite susceptible to interference per se, is reliably applicable, since in these cases the noise may be neglected in relation to the signal strength.

In one particularly preferred specific embodiment of the present invention, the analysis device according to the present invention includes a first capacitor, which is configured for the purpose of filtering out a direct voltage component of the electrical signal of the electroacoustic transducer and providing the filtered electrical signal to the determination device as an input signal.

Since acoustic signals naturally do not have a direct voltage component, the direct component of the electrical signal of the electroacoustic transducer is excluded in a simple way at the input with the aid of the first capacitor.

In one particularly easily implementable specific embodiment of the present invention, the determination device according to the present invention includes a first threshold value switch, which is designed for the purpose of converting the level change of the input signal into a first time-continuous binary signal and providing it to a downstream time measuring unit. In particular, the determination device includes a derivative element, which is designed for the purpose of delaying the input signal with the aid of a phase shift in such a way that a level change of a corresponding output signal of the derivative element is achieved precisely when the input signal has a maximum signal strength or a minimum signal strength. Furthermore, the determination device includes a second threshold value switch, which is designed for the purpose of converting the level change of the output signal, and thus the points in time of the occurrence of the maximum and the minimum signal strengths of the input signal, into a second binary signal and providing it to the time measuring unit. The time measuring unit is designed for the purpose of measuring the points in time of the occurrence of the level change of the input signal and thus the points in time of the occurrence of the zero crossings of the input signal and/or the points in time of the occurrence of the level change of the output signal and thus the point in time of the occurrence of the minimum and the maximum signal strengths of the input signal with the aid of the first and/or the second binary signals and providing it to the downstream evaluation device.

The points in time thus obtained from the signal curve are used in particular for the purpose of obtaining characteristic parameters, such as in particular parameters of the signal strength. In one preferred embodiment, at least one sampling device for obtaining characteristic values of the signal strength is controlled on the basis of these points in time. In one preferred embodiment, these values are processed further according to the present invention with the aid of at least one analog-to-digital converter in a computer.

In another easily implementable and thus particularly advantageous specific embodiment of the present invention, the determination device includes a first changeover switch, which is switchable with the aid of the second threshold value switch or with the aid of a monoflop controlled by the second threshold value switch from a first changeover position to a second changeover position. Furthermore, the changeover switch is configured for the purpose, in its first changeover position, of transferring the input signal to a second capacitor and, upon the presence of the points in time, which are recognized with the aid of the second threshold value switch of the occurrence of the minimum and/or the maximum signal strengths of the input signal, to switch over to its second changeover position. Furthermore, the second capacitor is configured for the purpose of transferring its stored instantaneous voltage via the first changeover switch, which is switched over into its second changeover position, and via a second changeover switch, which is switchable with the aid of the first threshold value switch as a function of the level position of the input signal, to a first memory for the minimum signal strength of the input signal or a second memory for the maximum signal strength of the input signal, depending on the present level position of the input signal.

Furthermore, a vehicle including a surroundings detection device according to the present invention is provided according to the present invention.

DETAILED DESCRIPTION OF THE INVENTION

As already mentioned, undisturbed sinusoidal signals may be described by equation (1):

$$r(\tau) = A_1 \cdot \sin(2\pi f \tau + \phi) + A_0 \quad (1)$$

Figure 3A:
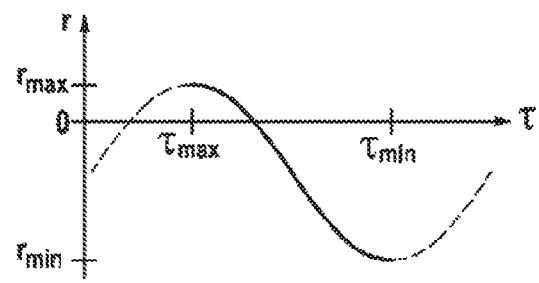
FIGS. 3a and 3b each show a detail of a sinusoidal signal.
Figure 3B:
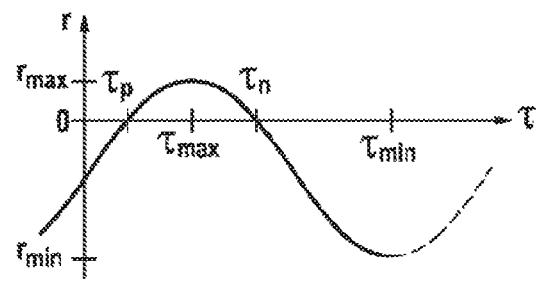

Excerpts of a sinusoidal signal $r(\tau)$ are shown in each case in FIGS. 3a and 3b.

If the distinctive parameters for a sinusoidal signal $r(\tau)$, such as zero crossings $$\tau_p \Big| \lim_{x \to +0} (r(\tau_p + x) - (\tau_p - x)) > 0,$$

$$\tau_n \Big| \lim_{x \to +0} (r(\tau_n + x) - r(\tau_n - x)) < 0$$

and peaks, i.e., turning points $r_{max}(\tau_{max})$, $r_{min}(\tau_{min})$ may be determined, and if a signal analysis according to the present invention is applied in the time range, the time from ½ to ¾ of a signal period of an unknown sinusoidal signal which is subject to mean value $A_0$ is sufficient to determine the parameters which characterize the signal. This is recognizable from equations (2) and (3):

$$A_0 = \frac{r_m(\tau_{max}) + r_{min}(\tau_{min})}{2} \quad (2)$$

$$A_1 = \frac{r_m(\tau_{max}) - r_{min}(\tau_{min})}{2} \quad (3)$$

To determine variables f and $\tau$, the linear equation is to be applied to equation (4):

$$\arcsin\left(\frac{r(\tau) - A_0}{A_1}\right) = 2\pi f \cdot \tau + \varphi = \ldots \quad (4)$$

By way of the application of estimations about items of position information $r(\tau_x)$ and items of gradient information $r(\dot\tau_x)$, the time for determining the parameters of the sine function may be decreased still further. The greatest gradient is known to be in the zero point in the case of sinusoidal signals which are free of mean values. The zero crossing itself is already known to correspond to phase information $\phi$ with respect to an observation point. If one tracks the signal change from there with the aid of at least one gradient estimation $r(\dot\tau_x)$, a period duration of the still open parameters f and $A_1$ may be calculated there, particularly easily with undisturbed signals, already after only a few angle degrees of a period duration.

In summary, it may be stated that the more parameters $A_0$, $\phi$, f, and $A_1$ are already known at the beginning of the estimation, the more rapidly a determination of the still open parameters is achieved.

With interference-free sinusoidal signals, at most ¾ of the period duration is necessary in the time range to determine all variables according to the above-mentioned method.

For a high precision, however, a correspondingly high sampling frequency F>>f is required for this purpose, even time-continuous signal processing in the best case.

The greater an additive interference or additive noise, the longer must the influence of the noise be suppressed by averaging over multiple parameters determined in multiple successive signal periods.

In the case of time-continuous signal analysis having negligible interference, even less than ¼ period is sufficient, in particular if parameters such as mean value $A_0$ are known. Thus, for example, a fraction of a period is sufficient to infer amplitude $A_1$ and frequency f from the signal curve after the zero crossing.

Obtaining these features of a signal may be implemented according to the present invention preferably with the aid of at least one signal-curve-independent, in particular chronologically equidistant, sampling. Alternatively, these features of a signal may also be implemented according to the present invention with the aid of signal-curve-dependent sampling or, however, with the aid of a mixed form of signal-curve-dependent and signal-curve-independent sampling.

Figure 4:
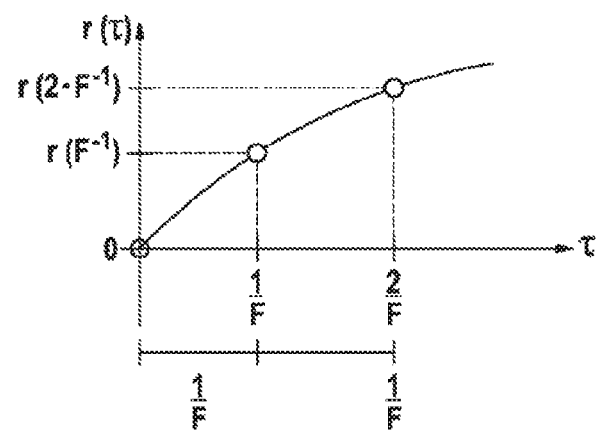
FIG. 4 shows a detail of a sinusoidal signal which is sampled with the aid of signal-curve-independent, chronologically equidistant sampling according to the present invention, together with the corresponding sampling points according to a first specific embodiment.

In FIG. 4, the sampling points of a signal $(r(\tau))$ are shown, which is predominantly sampled according to a method based on signal-curve-independent, chronologically equidistant sampling, according to a first specific embodiment of the present invention.

For example, if the zero crossing is at $\tau=0$ and subsequently the two sampling values having the sampling frequency F are obtained, equations (5) and (6) apply for sampling values r(F$^{-1}$) and r(2·F$^{-1}$) thus obtained:

$$r(1 \cdot F^{-1}) = A_1 \cdot \sin(2\pi f \cdot 1 \cdot F^{-1}) + A_0 \quad (5)$$

$$r(2 \cdot F^{-1}) = A_1 \cdot \sin(2\pi f \cdot 2 \cdot F^{-1}) + A_0 \quad (6)$$

After equation (5) is rearranged, equations (7) and (8) result:

$$r(1 \cdot F^{-1}) = A_1 \cdot \sin(2\pi f \cdot 1 \cdot F^{-1}) + A_0 \quad (7)$$

$$2\pi f = F \cdot \arcsin\left(\frac{r(1 \cdot F^{-1}) - A_0}{A_1}\right) \quad (8)$$

After the insertion of equations (7) and (8) into equation (6), the expression of amplitude $A_1$ results, which is explained by equation (9):

$$r(2 \cdot F^{-1}) = A_1 \cdot \sin\left(2 \cdot \arcsin\left(\frac{r(1 \cdot F^{-1}) - A_0}{A_1}\right)\right) + A_0 \quad (9)$$

Relationship (10) is used hereafter:

$$\sin\left(2 \cdot \arcsin\left(\frac{r(1 \cdot F^{-1}) - A_0}{A_1}\right)\right) = \sin\left(\arcsin\left(\frac{r(1 \cdot F^{-1}) - A_0}{A_1}\right) + \arcsin\left(\frac{r(1 \cdot F^{-1}) - A_0}{A_1}\right)\right) \quad (10)$$

$$= \sin\left(\arcsin\left(\frac{r(1 \cdot F^{-1}) - A_0}{A_1}\right)\right) \cdot \cos\left(\arcsin\left(\frac{r(1 \cdot F^{-1}) - A_0}{A_1}\right)\right) + \cos\left(\arcsin\left(\frac{r(1 \cdot F^{-1}) - A_0}{A_1}\right)\right) \cdot \sin\left(\arcsin\left(\frac{r(1 \cdot F^{-1}) - A_0}{A_1}\right)\right)$$

$$= 2 \cdot \left(\frac{r(1 \cdot F^{-1}) - A_0}{A_1}\right) \cdot \cos\left(\arcsin\left(\frac{r(1 \cdot F^{-1}) - A_0}{A_1}\right)\right)$$

After the insertion of relationship (10) into equation (9), equation (11) results:

$$r(2 \cdot F^{-1}) = A_1 \cdot 2 \cdot \left(\frac{r(1 \cdot F^{-1}) - A_1}{A_1}\right) \cdot \cos\left(\arcsin\left(\frac{r(1 \cdot F^{-1})A_0}{A_1}\right)\right) + A_0 \quad (11)$$

After the rearrangement of equation (11), equation (12) results:

$$\sin\left(\arccos\left(\frac{r(2 \cdot F^{-1}) - A_0}{2 \cdot r(1 \cdot F^{-1}) - A_0}\right)\right) = \frac{r(1 \cdot F^{-1}) - A_0}{A_1} \quad (12)$$

From equation (12), the expression for amplitude $A_1$ results, which is represented by equation (13):

$$A_1 = \frac{r(1 \cdot F^{-1}) - A_0}{\sin\left(\arccos\left(\frac{r(2 \cdot F^{-1}) - A_0}{2 \cdot r(1 \cdot F^{-1}) - A_0}\right)\right)} \quad (13)$$

The expression of frequency f, which results after the rearrangement of equation (8), is explained by relationship (14):

$$f = \frac{F}{2\pi} \cdot \arcsin\left(\frac{r(1 \cdot F^{-1}) - A_0}{A_1}\right) \quad (14)$$

This method illustrated on the basis of FIG. 4 is based on signal-curve-independent, chronologically equidistant sampling. The excerpts thus obtained from the signal curve are preferably processed further according to the present invention, in particular using digital computers according to the above-mentioned rules.

Figure 5:
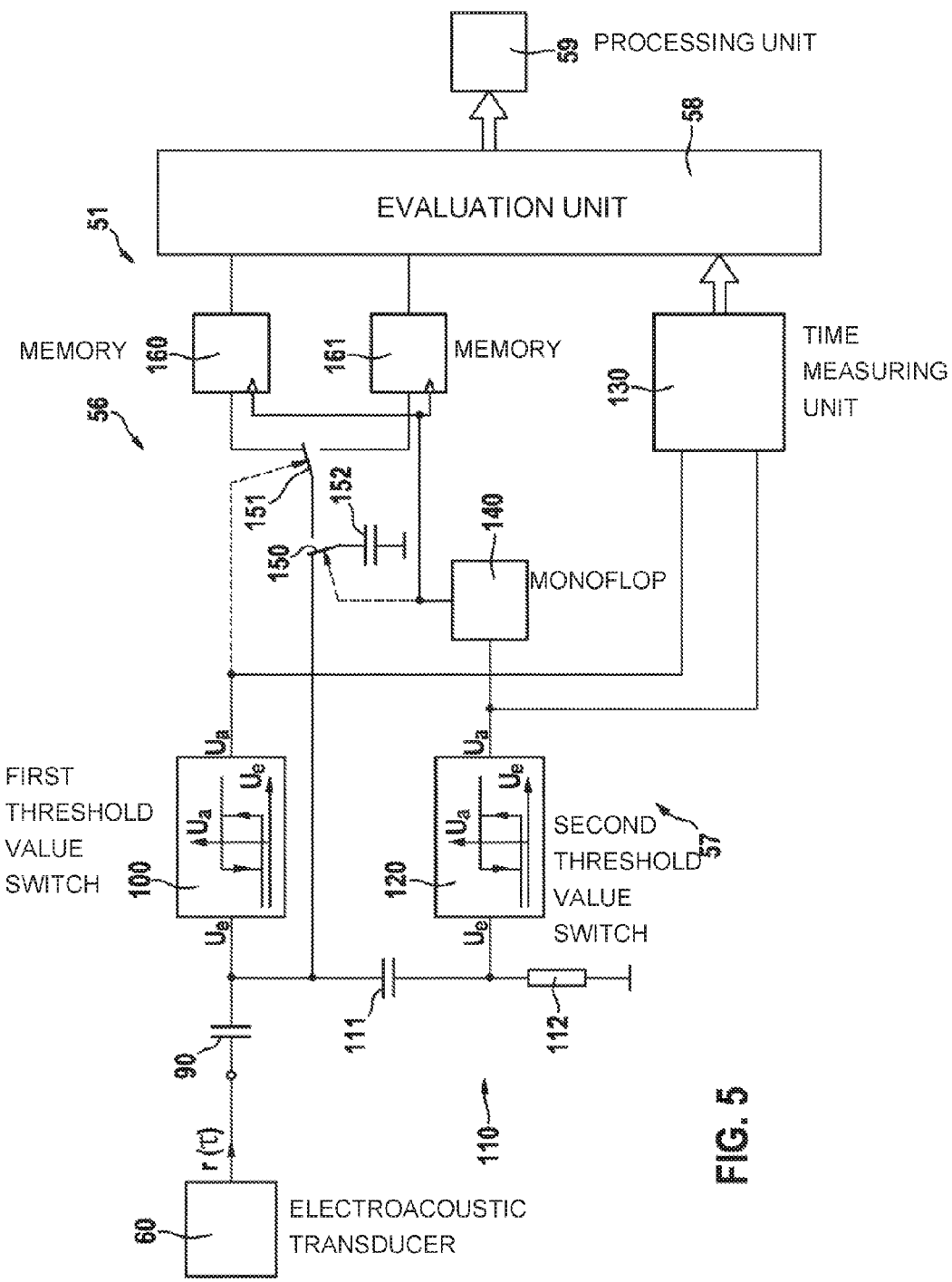
FIG. 5 shows a schematic block diagram of a surroundings detection device according to a second specific embodiment of the present invention, which is based on signal-curve-dependent sampling.

FIG. 5, in contrast, shows a schematic block diagram of a signal-curve-controlled surroundings detection device 51 according to a second specific embodiment of the present invention, surroundings detection device 51 being designed for rapidly determining distinctive characteristic parameters, such as peak signal strengths and points in time of the occurrence of peaks and zero crossings.

With the aid of surroundings detection device 51 shown in FIG. 5, the method according to the present invention for rapidly analyzing signals in the time range may be carried out in a simple way.

Surroundings detection device 51 according to the present invention according to the first specific embodiment of the present invention includes an electroacoustic transducer 60 and an analysis device 56, which is designed for the purpose of providing electrical signal r(τ) of electroacoustic transducer 60 to a determination device 57 as an input signal. Determination device 57 is designed for the purpose of determining or repeatedly determining characteristic signal parameters of the electrical signal of the electroacoustic transducer 60.

Furthermore, analysis device 56 includes an evaluation unit 58, which is designed for the purpose of analyzing the determined characteristic signal parameter with respect to the changes in relation to corresponding, stored expected values and/or with respect to the changes of the characteristic signal parameters arising during the repeated determination, to determine the electrical signal of electroacoustic transducer 60 and in particular to provide it to a downstream post-processing unit (usage unit) 59. At least one output of evaluation unit 58 is electrically connected to an input of downstream post-processing unit (usage unit) 59.

Since acoustic signals naturally do not have a direct voltage component, at the input side, the direct component of signal r(τ) of electroacoustic transducer 60 is excluded at the input side with the aid of a first series capacitor 90 included by analysis device 56. First capacitor 90 is connected between the output of the electroacoustic transducer 60 and an input of downstream determination device 57. It is known to those skilled in the art that in addition to this conventional form of direct voltage suppression, there are also further forms of direct voltage suppression (not shown separately here), and there are also methods, with the aid of which signals subject to direct voltage may be analyzed suitably. In such methods, for example, the relationships specified in equations (2) and (3) are used.

Determination device 57 includes a first threshold value switch (level change) 100, whose input is electrically connected to the input of the determination device. First threshold value switch 100 is electrically connected at its output to a first input of a time measuring unit 130 included by determination device 57 and converts input signal $U_e$ into a time-continuous binary signal $U_a$, which it transfers to time measuring unit 130.

Time measuring unit 130 is designed for the purpose of measuring the points in time for the level changes of input signal $U_e$ with the aid of binary signal $U_e$ generated by first threshold value switch 100 and relating them to other signals. Time measuring unit 130 is connected at one output to a corresponding input of evaluation unit 58 and is furthermore designed for the purpose of transferring the measured points in time to evaluation unit 58.

Determination device 57 also includes a derivative element 110, which has a capacitor 111 and a resistor 112 in this example. Capacitor 111 is connected at its first end to the input of first threshold value switch 100 and at its second end to a first end of resistor 112 and to the input of a second threshold value switch 120, which is included by determination device 57. Resistor 111 is connected between the second end of capacitor 111 and ground.

Suitably designed derivative element 110 delays input signal $U_e$ with a phase rotation of approximately 90°, so that a level change is achieved at the output of derivative element 110 when input signal $U_e$ has a peak value. With the aid of second threshold value switch (peak detection) 120, such a level change is converted into a binary signal $U_a$ and provided to time measuring unit 130.

Time measuring unit 130 is furthermore connected at a second input to the output of second threshold value switch 120 and designed for the purpose of measuring the points in time at which the peaks occur and/or at which the zero points occur, and furthermore to relay the measured points in time to evaluation unit 58. Evaluation unit 58 is designed for the purpose of studying the relationships of the measured values and/or even the sequences of the measured values on the basis of stored reference values and/or on the basis of the chronological relationships of the measured values to one another, to determine the state of surroundings detection device (measuring system) 51 and provide it to downstream usage units (users) 59.

Many of the variable parameters of the signal, which are to be determined according to the present invention and are dependent on the conditions at and before the transducer, may be obtained, in particular in the case of narrowband signals, solely from the measured points in time. These points in time derived from the signal curve, which are preferably further processed according to the present invention with the aid of digital computers, may also be used, however, to obtain characteristic parameters of the signal strength, preferably by sampling the signal.

For this purpose, determination device 57 furthermore includes, for example, a monoflop 140, a first changeover switch 150, a second changeover switch 151, and a second capacitor 152.

The input signal, which is applied, inter alia, to input $U_e$ of threshold value switch 100, is also provided via first changeover switch 150, which is controlled by monoflop 140, to second capacitor (sampling capacitor) 152.

The input of first threshold value switch 100 may be electrically coupled with the aid of first changeover switch 150 to a first end of second capacitor 152, which is connected to ground at a second end. Monoflop 140 is electrically connected at its input to the output of second threshold value switch 120 and controls first changeover switch 150 via its output.

The determination device also includes a memory 160 for storing maximum peak values of input signal $U_e$ and a memory 161 for storing minimum peak values of input signal $U_e$.

Second capacitor 152 is designed in such a way that its instantaneous voltage always nearly corresponds to instantaneous input voltage $U_e$. A peak point in time, which is recognized by second threshold value switch 120, is converted by monoflop 140 into a short pulse, by which the instantaneous voltage stored on second capacitor 152 is transferred via a second changeover switch 152, which is controlled with the aid of first threshold value switch 100, into corresponding downstream memory 160, 161 to store the corresponding peak value. Depending on the position of the level of output signal $U_a$ of 100, second changeover switch 152 is controlled with the aid of first threshold value switch 100 in such a way that when the instantaneous voltage of second capacitor 152 corresponds to the maximum peak value of input signal $U_a$, this instantaneous voltage is transferred to memory 160 for storing maximum peak values, and when the instantaneous voltage of second capacitor 152 corresponds to the minimum peak value of input signal $U_a$, this instantaneous voltage is transferred to memory 161 for storing minimum peak values 161.

Second capacitor 152 may be electrically coupled with the aid of first changeover switch 150 and with the aid of second changeover switch 151 to an input of one of the two memories 160, 161, respectively. Second changeover switch 151 is controlled via the output of first threshold value switch 100. The outputs of memories 160, 161 are each electrically coupled to a corresponding input of evaluation unit 58.

To avoid high current surges during the sampling, sampling capacitor 152 is to be designed as sufficiently small and/or the current surge level is to be limited with the aid of a series resistor.

Alternatively, a sample-and-hold circuit 151, which is controlled by second threshold value switch 120, having a subsequent analog-to-digital converter (not shown) may also directly follow sampling capacitor 152, to implement the basic idea of the present invention, obtaining and analyzing the peak values. The use of sample-and-hold circuit 151, which is controlled by second threshold value switch 120, does not result in chronologically equidistant points in time, as in usual sampling. The peak values thus obtained are also provided to downstream evaluation unit 58 and downstream usage unit 59.

Downstream users 59 may be units which inform the vehicle driver that, for example, acoustic surroundings detection device (sensor system) 51 may only be used in weakened form or is not available or is to be cleaned, or individual components such as transducer 60, lines, analysis device 56 are to be replaced. If the rapid analysis of the time signals is used to analyze received signals of system-external ultrasonic signals (for example, during a vehicle-to-vehicle communication) and/or to analyze echoes of the emitted acoustic signals, items of information may also be relayed to the vehicle driver on the basis of the signal analysis, which assist the vehicle driver in the operation of the vehicle, or units may be activated, which act on the vehicle to accelerate/brake and/or to change the travel direction, as long as the vehicle driver initiates this by his/her operating actions and does not take opposing operating actions.

The rapid evaluation of the signals of transducer 60 is preferably to be housed with respect to circuitry in the sensor itself, so that in this way independent monitoring of the sensor may be achieved during the decay of the signal and/or during the transmission and/or during the other operation, for example, during the reception.

Alternatively, however, the method may also be used outside the sensor, for example, to evaluate sensors in a repair shop or at the end of the sensor manufacturing and/or during the comparison of various systems, for example, by "Stiftung Warentest Underwriters Laboratories," or during the competitor analysis.

Figure 6:
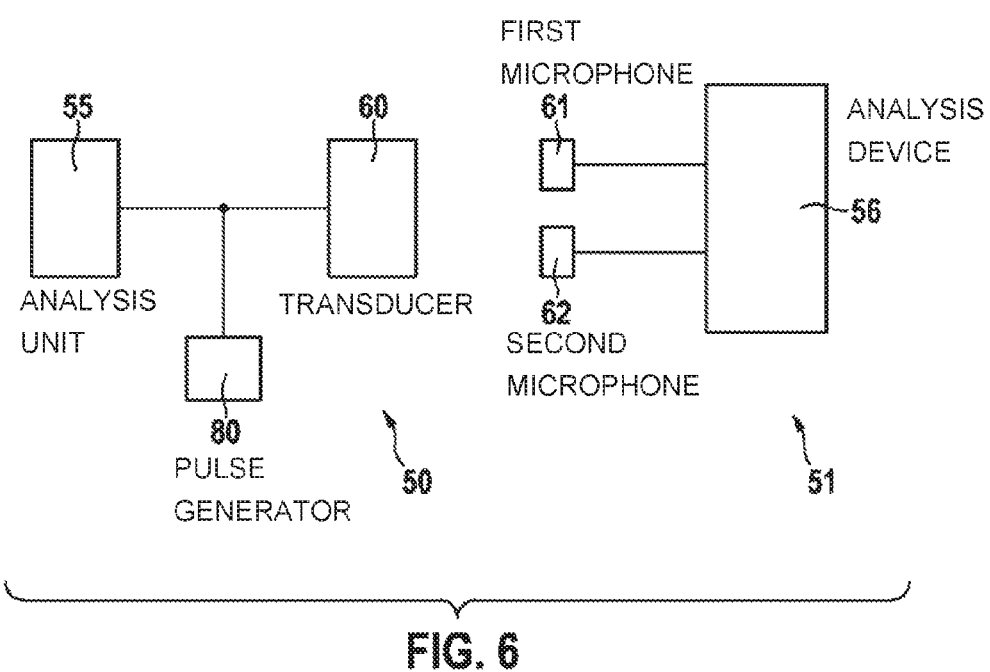
FIG. 6 shows a schematic block diagram of a surroundings detection device according to a third specific embodiment of the present invention.

FIG. 6 shows such a surroundings detection device 51 according to a third specific embodiment of the present invention. Surroundings detection device 51 according to the third specific embodiment of the present invention is designed according to the present invention for rapidly determining distinctive characteristic parameters (features) such as peak signal strengths and points in time of the occurrence of peaks and zero crossings of an acoustic transducer by a signal analysis in the time range.

Figures 1A, 1B, 1C, 1D, 1E:
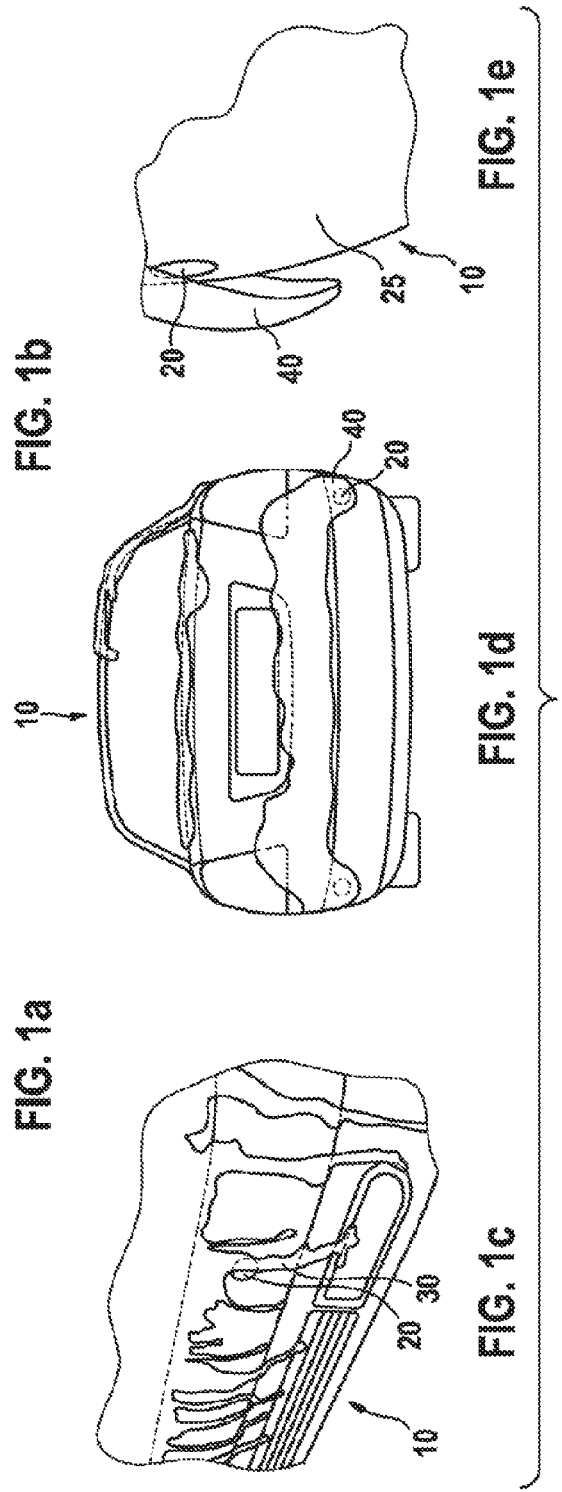
FIGS. 1a through 1e each show a vehicle including at least one ultrasonic sensor according to the related art, the sensors being covered by ice or snow.
Figure 2:
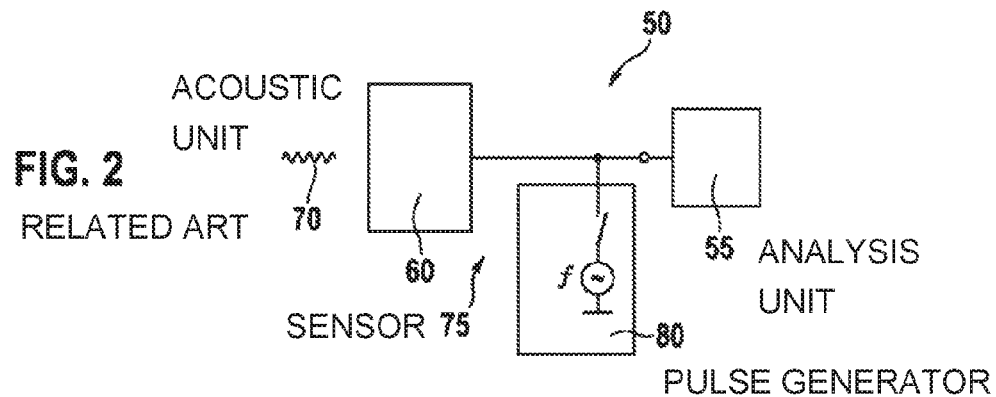
FIG. 2 shows a surroundings detection device including an ultrasonic sensor and an analysis unit according to the related art.

A typical transducer 60 according to FIG. 2, which emits acoustic signals, is shown on the left in FIG. 6. Transducer 60 is activated to emit acoustic signals in particular with the aid of a conventional transmission pulse generator 80. The measured signals of transducer 60 may be analyzed with the aid of a conventional analysis unit 55.

With the aid of a first microphone 61, which is set to "muted" and with the aid of a second microphone 62, which is set to "loud", the acoustic signals transmitted by conventional transducer 60 are tapped by the use of different propagation characteristics at various strengths and provided to downstream analysis device 56. Analysis device 56 is designed according to FIG. 5 for the purpose of analyzing the signals of microphones 61, 62 with the aid of a time-continuous signal analysis according to the present invention.

In particular, analysis device 56 may be designed for the purpose of analyzing the signals of microphones 61, 62 on the basis of a time discretization generated with the aid of a sampling according to the illustration in FIG. 4.

Finally, it is to be clarified once again that substantially more items of information may be obtained from the signal with the aid of the time analysis described here during each signal period, such as the duration and the peak height of each half-period and the chronological location of the peaks within a half-period, than using a conventional frequency measurement, which only delivers reliable values if the system to be studied is in a stationary state.

In addition to the above written disclosure, supplementary reference is hereby made to the illustration in FIGS. 1 through 6 for the further disclosure of the present invention.

What is claimed is:

1. A method for determining at least one of a position and a movement of at least one object in the vicinity of a vehicle, the method comprising:
   transmitting at least one acoustic signal using an electroacoustic transducer;
   receiving the acoustic signal reflected off of the object;
   analyzing one of: (a) the acoustic signal reflected off of the object; and (b) the time behavior of at least one electrical signal of the electroacoustic transducer during at least one of (i) the transmission of the acoustic signal, (ii) a decay of the electroacoustic transducer following the transmission of the acoustic signal, and (iii) the reception of the acoustic signal reflected off of the object, wherein the analyzing is performed at least during a selected fraction of a signal period so that a change of the electrical signal of the electroacoustic transducer is detectable; and
   determining, via a determination device, wherein the analysis device provides the electrical signal of the electroacoustic transducer to the determination device as an input signal, at least one characteristic signal parameter of the electrical signal of the electroacoustic transducer, and wherein the determination device includes at least one of: (i) a first threshold value switch; (ii) a derivative element and (iii) a second threshold value switch;
   wherein the determination device includes a first changeover switch which is switchable from a first changeover position into a second changeover, wherein the determination device is configured to transfer the input signal to a second capacitor in a first changeover position, and to switch over to a second changeover position, upon detecting with the second threshold value switch, the time of occurrence of at least one of a minimum signal strength and a maximum signal strength of the input signal.

2. The method as recited in claim 1, wherein, for the detection of a change of the electrical signal of the electroacoustic transducer, the following is performed:
   at least one of the following characteristic signal parameters is determined during the selected fraction of the signal period: (i) the minimum signal strength; (ii) the maximum signal strength; (iii) a maximum between a minimum signal strength absolute value and a maximum signal strength absolute value; (iv) a signal strength mean value; (v) a point in time of an occurrence of a zero crossing; (vi) a point in time of the occurrence of the minimum signal strength; and (vii) a point in time of the occurrence of the maximum signal strength; and
   comparing the at least one determined characteristic signal parameter to at least one of a corresponding expected value and a corresponding previously determined characteristic signal parameter.

3. The method as recited in claim 2, wherein the signal curve of the electrical signal of the electroacoustic transducer is discretized with respect to time with equidistant sampling, and the at least one characteristic signal parameter is determined based on signal strength values determined with the sampling.

4. The method as recited in claim 2, wherein at least one of the following is performed to determine the at least one of the position and the movement of the object:
   (i) the time behavior of the at least one electrical signal of the electroacoustic transducer generated from the received acoustic signal reflected off of the object is analyzed, and wherein before the analysis of the time behavior, the at least one electrical signal of the electroacoustic transducer generated from the received acoustic signal reflected off of the object is amplified with the aid of an amplification dependent on the run time of the received acoustic signal; and (ii) multiple pulse-duration-modulated acoustic signals are transmitted.

5. The method as recited in claim 2, wherein:
a spatial arrangement of multiple objects in the surroundings of the vehicle is determined with the aid of the determined electrical signal of the electroacoustic transducer; and
at least one of (i) the driver of the vehicle is informed about the determined spatial arrangement of the objects, and (ii) an intervention in the vehicle dynamics is performed in response to the determined spatial arrangement of the objects.

6. A surroundings detection device for determining at least one of a position and a movement of at least one object in the vicinity of a vehicle, comprising:
an electroacoustic transducer transmitting at least one acoustic signal using and receiving the acoustic signal reflected off of the object;
a sampling device;
an analysis device analyzing one of: (a) the acoustic signal reflected off of the object; or (b) the time behavior of at least one electrical signal of the electroacoustic transducer during at least one of (i) the transmission of the acoustic signal, (ii) a decay of the electroacoustic transducer following the transmission of the acoustic signal, and (iii) the reception of the acoustic signal reflected off of the object, wherein the at least one electrical signal of the electroacoustic transducer is one of time-continuous or discretized with respect to time with the sampling device, and wherein the analyzing is performed at least during a selected fraction of a signal period so that a change of the electrical signal of the electroacoustic transducer is able to be detected; and
a determination device, wherein the analysis device provides the electrical signal of the electroacoustic transducer to the determination device as an input signal, wherein the determination device determines at least one characteristic signal parameter of the electrical signal of the electroacoustic transducer, and wherein the determination device includes at least one of: (i) a first threshold value switch; (ii) a derivative element and (iii) a second threshold value switch;
wherein the determination device includes a first changeover switch which is switchable from a first changeover position into a second changeover, wherein the determination device is configured to transfer the input signal to a second capacitor in a first changeover position, and to switch over to a second changeover position, upon detecting with the second threshold value switch, the time of occurrence of at least one of a minimum signal strength and a maximum signal strength of the input signal.

7. The surroundings detection device as recited in claim 6, further comprising:
an evaluation unit to compare the at least one characteristic signal parameter of the electrical signal of the electroacoustic transducer to at least one of a corresponding expected value and a corresponding previously determined characteristic signal parameter to (i) detect a change of the electrical signal of the electroacoustic transducer and (ii) provide the detected change of the electrical signal to a downstream post-processing.

8. The surroundings detection device as recited in claim 7, wherein the analysis device includes a first capacitor which filters out a direct voltage component of the electrical signal of the electroacoustic transducer and provides the filtered electrical signal to the determination device as an input signal.

9. The surroundings detection device as recited in claim 7, wherein the determination device includes at least one of:
(i) the first threshold value switch converting the level change of the input signal into a first time-continuous binary signal and providing the time-continuous binary signal to a downstream time measuring unit;
(ii) the derivative element delaying the input signal with the aid of a phase shift in such a way that a level change of a corresponding output signal of the derivative element is achieved when the input signal has one of a maximum signal strength or a minimum signal strength; and
(iii) the second threshold value switch converting the level change of the output signal such that the points in time of the occurrence of the maximum and the minimum signal strengths of the input signal are converted into a second binary signal which is provided it to the time measuring unit, wherein the time measuring unit measures at least one of (a) the points in time of the occurrence of the zero crossings of the input signal, and (b) the points in time of the occurrence of the minimum and the maximum signal strengths of the output signal with the aid of at least one of the first binary signal and the second binary signal, and wherein the time measuring unit provides the measured points in time to the downstream evaluation device.

10. The surroundings detection device as recited in claim 9, wherein
the first changeover switch is switchable from the first changeover position into the second changeover position with one of the second threshold value switch and a monoflop controlled by the second threshold switch, wherein the second capacitor transfers a stored instantaneous voltage via the first changeover switch, which is switched over into the second changeover position, and via the second changeover switch, which is switched with the first threshold value switch as a function of the level position of the input signal, to one of (i) a first memory for the minimum signal strength of the input signal and (ii) a second memory for the maximum signal strength of the input signal, depending on the present level position of the input signal.

* * * * *